United States Patent
Reichelderfer et al.

(10) Patent No.: US 8,752,366 B2
(45) Date of Patent: Jun. 17, 2014

(54) SYSTEMS AND METHODS FOR ABATING CARBON MONOXIDE IN AN EXHAUST STREAM

(75) Inventors: Kurt E. Reichelderfer, Independence, KY (US); David L. Euler, Stamping Ground, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 224 days.

(21) Appl. No.: 12/785,121

(22) Filed: May 21, 2010

(65) Prior Publication Data

US 2011/0283676 A1 Nov. 24, 2011

(51) Int. Cl.
- *F01N 3/00* (2006.01)
- *F01N 3/02* (2006.01)
- *F01N 3/20* (2006.01)

(52) U.S. Cl.
USPC .......... 60/289; 60/285; 60/286; 60/290; 60/300

(58) Field of Classification Search
USPC .................. 60/286–289, 299, 300
See application file for complete search history.

(56) References Cited

U.S. PATENT DOCUMENTS

| | | | |
|---|---|---|---|
| 3,996,793 A | 12/1976 | Topper | |
| 5,285,639 A * | 2/1994 | Araki et al. | 60/274 |
| 5,447,694 A * | 9/1995 | Swaroop et al. | 422/171 |
| 5,490,381 A * | 2/1996 | Becker | 60/274 |
| 5,722,236 A * | 3/1998 | Cullen et al. | 60/274 |
| 6,145,302 A * | 11/2000 | Zhang et al. | 60/274 |
| 6,207,120 B1 | 3/2001 | Belmonte et al. | |
| 6,354,078 B1 * | 3/2002 | Karlsson et al. | 60/274 |
| 6,471,924 B1 * | 10/2002 | Feeley et al. | 423/213.5 |
| 6,596,054 B2 | 7/2003 | Flippo et al. | |
| 6,722,125 B1 * | 4/2004 | Pfalzgraf | 60/295 |
| 6,802,181 B2 * | 10/2004 | Wang et al. | 60/289 |
| 6,813,883 B1 * | 11/2004 | Lewis | 60/289 |
| 7,111,454 B2 * | 9/2006 | Fulcher et al. | 60/289 |
| 7,118,717 B2 | 10/2006 | Shore | |
| 7,347,806 B2 | 3/2008 | Webb et al. | |
| 7,550,126 B2 | 6/2009 | Webb et al. | |
| 7,625,201 B2 | 12/2009 | Ingalls, Jr. et al. | |
| 7,650,225 B2 * | 1/2010 | Nakagawa et al. | 701/109 |
| 8,136,347 B2 * | 3/2012 | MacEwen et al. | 60/289 |
| 2003/0070423 A1 * | 4/2003 | Morinaga et al. | 60/284 |
| 2005/0016160 A1 * | 1/2005 | Takaku et al. | 60/277 |
| 2007/0245717 A1 * | 10/2007 | Kang et al. | 60/284 |
| 2008/0034851 A1 | 2/2008 | Anderson | |
| 2010/0115921 A1 * | 5/2010 | Gonze et al. | 60/285 |
| 2011/0146248 A1 * | 6/2011 | Charles et al. | 60/295 |
| 2011/0179780 A1 * | 7/2011 | Sugihara | 60/317 |

\* cited by examiner

*Primary Examiner* — Kenneth Bomberg
*Assistant Examiner* — Dapinder Singh
(74) *Attorney, Agent, or Firm* — Dinsmore & Shohl LLP

(57) ABSTRACT

A method for abating carbon monoxide in an exhaust stream may include injecting an amount of air into the exhaust stream to produce an air/exhaust mixture; measuring an air/fuel ratio of the air/exhaust mixture; reacting carbon monoxide in the air/exhaust mixture with oxygen in the presence of a catalyst to produce carbon dioxide to abate carbon monoxide in the air/exhaust mixture; measuring a temperature of the catalyst; and adjusting the amount of air injected into the exhaust stream based on the air/fuel ratio or the temperature of the catalyst.

18 Claims, 3 Drawing Sheets

SYSTEMS AND METHODS FOR ABATING CARBON MONOXIDE IN AN EXHAUST STREAM

TECHNICAL FIELD

The present disclosure generally relates to systems and methods for abating carbon monoxide in an exhaust stream and, more specifically, to systems and methods for abating carbon monoxide in an exhaust stream produced by an internal combustion engine which is undergoing testing.

BACKGROUND

As background, carbon monoxide may be produced by the combustion of many different types of fuels such as, for example, gasoline, diesel fuel, and natural gas. The combustion of these fuels may take place in automobile engines, heaters, boilers, and in many other types of machines and apparatuses. Due to environmental or other reasons, it may be desirable to abate the amount of carbon monoxide produced by the combustion of these fuels. Existing abatement systems such as, for example, regenerative thermal oxidizers may be relatively expensive to install and may only be able to abate the level of carbon monoxide in the exhaust stream by about 90% or less.

Accordingly, a need exists for alternative systems and methods for abating carbon monoxide in exhaust streams which are both cost-effective to install, cost-effective to operate, and can abate the carbon monoxide level by 90% or more.

SUMMARY

In one embodiment, a method for abating carbon monoxide in an exhaust stream may include injecting an amount of air into the exhaust stream to produce an air/exhaust mixture; measuring an air/fuel ratio of the air/exhaust mixture; reacting carbon monoxide in the air/exhaust mixture with oxygen in the presence of a catalyst to produce carbon dioxide to abate carbon monoxide in the air/exhaust mixture; measuring a temperature of the catalyst; and adjusting the amount of air injected into the exhaust stream based on the air/fuel ratio or the temperature of the catalyst.

In another embodiment, a system for abating carbon monoxide in an exhaust stream flowing in an exhaust conduit may include a blower, a catalytic converter, an air/fuel sensor, a temperature sensor, and a controller, wherein: the blower is fluidly coupled to the exhaust conduit upstream of the catalytic converter and is electrically coupled to the controller, wherein the blower injects an amount of air into the exhaust stream flowing in the exhaust conduit to produce an air/exhaust mixture; the catalytic converter is disposed in the exhaust conduit downstream of the blower such that the air/exhaust mixture flows through the catalytic converter, wherein the catalytic converter abates carbon monoxide in the air/exhaust mixture based on an amount of oxygen in the air/exhaust mixture; the air/fuel sensor is disposed in the exhaust conduit upstream of the catalytic converter and is electrically coupled to the controller, wherein the air/fuel sensor outputs an air/fuel signal indicative of an air/fuel ratio of the air/exhaust mixture; the temperature sensor is thermally coupled to the catalytic converter and electrically coupled to the controller, wherein the temperature sensor outputs a temperature signal indicative of a temperature of the catalytic converter; and the controller comprises a processor and a memory having computer-readable and computer-executable instructions, and the processor executes the computer-readable and computer-executable instructions to: receive the air/fuel signal from the air/fuel sensor, receive the temperature signal from the temperature sensor, determine a blower control signal based on the air/fuel signal or the temperature signal, and output the blower control signal to the blower to adjust the amount of air injected into the exhaust stream.

In yet another embodiment, a system for testing an internal combustion engine having an engine exhaust outlet to carry away an exhaust stream produced by the internal combustion engine may include an exhaust conduit, a blower, a catalytic converter, an air/fuel sensor, a temperature sensor, and a controller, wherein: the exhaust conduit is fluidly coupled to the engine exhaust outlet of the internal combustion engine and receives the exhaust stream produced by the internal combustion engine; the blower is fluidly coupled to the exhaust conduit upstream of the catalytic converter and is electrically coupled to the controller, wherein the blower injects an amount of air into the exhaust stream flowing in the exhaust conduit to produce an air/exhaust mixture; the catalytic converter is disposed in the exhaust conduit downstream of the blower such that the air/exhaust mixture flows through the catalytic converter, wherein the catalytic converter abates carbon monoxide in the air/exhaust mixture based on an amount of oxygen in the air/exhaust mixture; the air/fuel sensor is disposed in the exhaust conduit upstream of the catalytic converter and is electrically coupled to the controller, wherein the air/fuel sensor outputs an air/fuel signal indicative of an air/fuel ratio of the air/exhaust mixture; the temperature sensor is thermally coupled to the catalytic converter and electrically coupled to the controller, wherein the temperature sensor outputs a temperature signal indicative of a temperature of the catalytic converter; and the controller comprises a processor and a memory having computer-readable and computer-executable instructions, and the processor executes the computer-readable and computer-executable instructions to: receive the air/fuel signal from the air/fuel sensor, receive the temperature signal from the temperature sensor, determine a blower control signal based on maintaining the air/fuel ratio of the air/exhaust mixture between about 14 parts air per part fuel and about 15 parts air per part fuel when the temperature of the catalytic converter is below an operating temperature range of the catalytic converter, or based on maintaining the temperature of the catalytic converter within the operating temperature range when the temperature of the catalytic converter is within or above the operating temperature range, and output the blower control signal to the blower to adjust the amount of air injected into the exhaust stream.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

Figure 1:
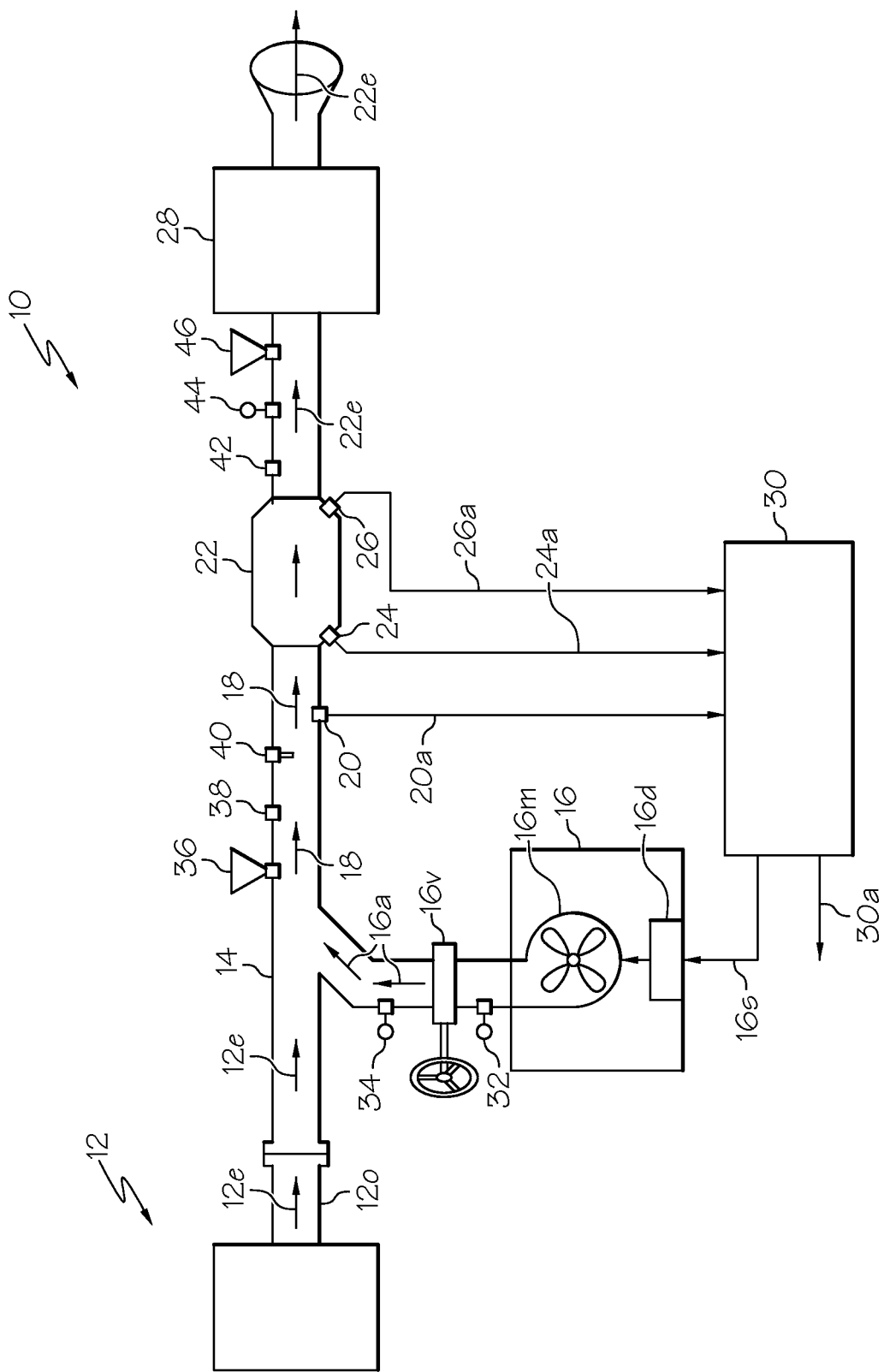
FIG. 1 schematically depicts a system for abating carbon monoxide in an exhaust stream according to one or more embodiments shown and described herein.

FIG. 1 generally depicts one embodiment of a system for abating carbon monoxide (CO) from an exhaust stream produced by the combustion of fuel. The system generally comprises an exhaust conduit, a blower, an air/fuel sensor, a catalytic converter, one or more temperature sensors, and a controller. The exhaust stream may be produced by an internal combustion engine which is undergoing testing in order to ascertain its durability, performance, or reliability or to evaluate the quality of the components or subassemblies used by the engine. When being tested, an engine may be disposed in a test cell and may be subjected to a particular test profile, which may specify the speed of the engine as well as the duration of the test. The test profile may specify that the engine be operated at low speeds, high speeds, or combinations thereof. Thus, the system may be capable of abating CO from an exhaust stream having varying levels of CO as well as flow volume. Methods and systems for abating CO in an exhaust gas stream will be described in more detail herein.

For purposes of this disclosure, the term "engine" or "internal combustion engine" may refer to any type of internal combustion engine including, but not limited to, a gasoline engine or a diesel engine. It is contemplated that other types of internal combustion engines may be used as well, including variations of the gasoline and diesel engines currently known and those yet to be discovered. The engine may comprise one or more pistons or one or more rotors for Wankel (rotary) engines. For example, the engine may include a four-cylinder, a six-cylinder, or an eight-cylinder engine.

For purposes of this disclosure, stating that Component A is "upstream" of Component B means that the direction of flow of the fluid (e.g., the exhaust stream or the air/exhaust mixture, as discussed herein) is from Component A to Component B. Likewise, stating that Component X is "downstream" of Component Y means that the direction of flow of the fluid is from Component Y to Component X.

Referring now to FIG. 1, one embodiment of a system 10 for abating CO from an exhaust stream 12e is depicted. The system 10 may comprise an exhaust conduit 14, a blower 16, an air/fuel sensor 20, a catalytic converter 22, temperature sensors 24, 26, and a controller 30. In the embodiment depicted in FIG. 1, the exhaust stream 12e is produced by an engine 12. However, it should be understood that the exhaust stream may come from other devices such as, for example, heaters, boilers, and so forth. The exhaust stream 12e may contain CO as well as other chemicals.

The blower 16 is fluidly coupled to the exhaust conduit 14 upstream of the catalytic converter 22 and is electrically coupled to the controller 30. The blower 16 is capable of injecting an amount of air 16a into the exhaust stream 12e flowing in the exhaust conduit 14 to produce an air/exhaust mixture 18. The catalytic converter 22 is disposed in the exhaust conduit 14 downstream of the blower 16 such that the air/exhaust mixture 18 flows through the catalytic converter 22 prior to exiting the exhaust conduit 14. The catalytic converter 22 abates CO in the air/exhaust mixture 18 based on the amount of oxygen in the air/exhaust mixture.

The air/fuel sensor 20 is disposed in the exhaust conduit 14 upstream of the catalytic converter 22 and is electrically coupled to the controller 30. The air/fuel sensor 20 measures the air/fuel ratio of the air/exhaust mixture 18 and outputs an air/fuel signal 20a indicative of the air/fuel ratio. The temperature sensors 24, 26 are thermally coupled to the catalytic converter 22 and electrically coupled to the controller 30. The temperature sensors 24, 26 measure the temperature of the catalytic converter 22 and output temperature signals 24a, 26a indicative of the temperature of the catalytic converter 22.

The controller 30 comprises a processor and a memory (e.g., see FIG. 2) having computer-readable and computer-executable instructions. The controller 30 executes these instructions in order to: receive the air/fuel signal 20a from the air/fuel sensor 20, receive the temperature signals 24a, 26a from the temperature sensors 24, 26, determine a blower control signal 16s based on the air/fuel signal 20a or the temperature signals 24a, 26a, and output the blower control signal 16s to the blower 16 to adjust the amount of air 16a injected into the exhaust stream 12e. These and other components of the system 10 are explained in more detail below.

As indicated above, the source of the exhaust stream 12e may be an engine 12 (e.g., an internal combustion engine) such as one used in automobiles, trucks, and other types of vehicles. It is to be understood that the combustion of the fuel may also take place in heaters, boilers, and other types of machines and apparatuses. The fuel may include gasoline, diesel fuel, natural gas, and other fuels which are capable of producing carbon monoxide during the combustion process. If an engine 12 is the source of the exhaust stream 12e, it may be mechanically coupled to a test stand (not shown) for testing purposes. Alternatively, the engine may be disposed in an automobile or truck (not shown) which may be located inside a test cell. The test stand or test cell may include additional devices or components (not shown) which may facilitate the operation of the engine 12, the test stand, or the test cell. As an example, the test stand may include a fuel tank (e.g., to supply fuel to the engine 12) and acoustic noise reduction devices.

The engine 12 is capable of combusting gasoline, diesel fuel, or other types of liquid or gaseous fuels. The combustion process for the engine 12 includes mixing the fuel and air to create an air/fuel mixture and igniting the air/fuel mixture after it has entered the combustion chamber of the engine 12. Mixing the fuel with air provides oxygen for the combustion process. In order to completely burn all of the fuel, the engine 12 controls the ratio of the air to the fuel present during combustion, called the air/fuel ratio. When the fuel and oxygen are chemically balanced, theoretically all the available fuel is combined with all the free oxygen (e.g., within the engine's combustion chamber). This air/fuel ratio is often called the stoichiometric point and may be about 14.7 (i.e., 14.7 parts air per 1 part fuel) for gasoline. The stoichiometric point for other types of fuel may be higher or lower than that of gasoline.

The chemical reaction for the combustion process for gasoline may be as follows:

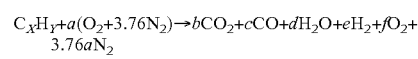

$$C_XH_Y + a(O_2 + 3.76N_2) \rightarrow bCO_2 + cCO + dH_2O + eH_2 + fO_2 + 3.76aN_2$$

where the materials to the left of the arrow (→) are the reactants, and the materials to the right of the arrow are the products (e.g., the chemicals which make up the exhaust stream 12e). The reactant "$C_XH_Y$" represents the fuel, and the reactant "$O_2 + 3.76N_2$" represents air. The 3.76 coefficient indicates that air has about 3.76 times as much nitrogen as oxygen. The "a" coefficient indicates the air/fuel ratio. The "b," "c," "d," "e," and "f" coefficients on the product side represent the amount of carbon dioxide ($CO_2$), carbon monoxide (C), water ($H_2O$), hydrogen ($H_2$), and oxygen ($O_2$)

produced by the combustion, respectively, and may depend on the value of "a." If there is excess oxygen on the reactant side (i.e., the air/fuel ratio is above the stoichiometric point), the "c" and "e" coefficients theoretically go to zero while the "b," "d," and "f" coefficients are non-zero. If there is excess fuel on the reactant side (i.e., the air/fuel ratio is below the stoichiometric point), the "f" coefficient theoretically goes to zero while the "b," "c," "d," and "e" coefficients are non-zero. When operated at high loads and/or high speeds, the engine may operate in an excess fuel condition, which may cause CO to be produced as a product of combustion. Other factors such as, for example, the engine temperature, variations in the atmospheric pressure, or variations in the engine components (e.g., sensors, fuel injectors) may also cause the engine to produce CO.

The exhaust stream 12e produced by the engine 12 is directed into an exhaust conduit 14 such as, for example, a pipe or other suitable device. The exhaust conduit 14 may facilitate the flow of the exhaust stream 12e from its source to the catalytic converter 22. If the source of the exhaust stream 12e is an engine, as shown in FIG. 1, the exhaust conduit 14 may be fluidly coupled to an exhaust outlet 12o of the engine 12. The exhaust outlet 12o may be, for example, one or more exhaust manifolds of the engine 12. The exhaust conduit 14 may have a coupler which allows the air 16a from the blower 16 to be injected into the exhaust stream 12e to produce the air/exhaust mixture 18. The exhaust conduit 14 is fluidly coupled to the catalytic converter 22 so that the air/exhaust mixture 18 flows through the catalytic converter 22.

As shown in FIG. 1, the blower 16 may be fluidly coupled to the exhaust conduit 14 and may be capable of injecting air 16a into the exhaust stream 12e to produce the air/exhaust mixture 18. The blower 16 is fluidly coupled to the exhaust conduit 14 upstream of the catalytic converter 22. A blower valve 16v may be disposed between the blower 16 and the exhaust conduit 14 for developmental and/or testing purposes. Normally, the blower valve 16v is fully opened when the system 10 is operating (i.e., when the blower 16 is injecting air 16a into the exhaust stream 12e). The blower 16 pressurizes ambient air (e.g., via a pump or a fan) and injects the pressurized air into the exhaust stream 12e to create the air/exhaust mixture 18. As shown in FIG. 1, the exhaust conduit 14 may have a "Y" or other suitable coupler in order to fluidly couple the air 16a from the blower 16 to the exhaust stream 12e.

The blower 16 is capable of varying the amount of air 16a injected into the exhaust stream 12e. Specifically, the blower 16 receives a blower control signal 16s from the controller 30 which sets the amount of air 16a injected into the exhaust stream 12e by controlling the speed of the blower 16. The blower control signal 16s is able to adjust the amount of air 16a injected into the exhaust conduit 14 from 0 cubic feet per minute (cfm) to the rated capacity of the blower 16 which, in the embodiments described herein, is about 550 cfm. The rated capacity of the blower 16 is selected based on one or more parameters of the system 10 including, but not limited to, the maximum flow rate of the exhaust stream 12e, the size of the catalytic converter 22, and/or the expected range of the air/fuel ratio of the air/exhaust mixture 18.

The blower 16 may include an actuator 16m and a drive 16d. The actuator 16m may comprise a motor coupled to a fan (e.g., rotary fan blades, squirrel-case rotor, rotary lobes, etc.) The rotation of the motor 16m causes the fan to rotate which injects air 16a into the exhaust stream 12e. The higher the rotational speed of the fan, the more air 16a is injected into the exhaust stream 12e. Thus, adjusting the rotational speed of the motor causes the amount of air 16a injected to be adjusted accordingly. The drive 16d may be electrically coupled to the motor and may be used to adjust the speed of the motor. The drive 16d may also be electrically coupled to the blower control signal 16s such that the drive 16d receives the blower control signal 16s and generates suitable electrical signals for the motor in order to operate the motor at a rotational speed corresponding to the level of the blower control signal 16s. The drive 16d may be coupled to a power source such as the local power grid (e.g., 480 VAC, three phase power) in order to provide power to drive the motor. The drive 16d may, for example, be a variable frequency drive which generates variable frequency AC signals in order to adjust the speed of the motor. Other types of drives may be used as well.

The actuator 16m and the drive 16d may be integrated into the blower 16 so as to comprise a single unit. Alternatively, the actuator 16m and the drive 16d may be separate units and may be purchased from different suppliers. For example, in one embodiment, the actuator 16m may be Model DB165C-25 available from Kaeser Compressors, Inc., of Fredericksburg, Va., and the drive 16d may be a model from the FR-F740 Series available from Mitsubishi Electric of Tokyo, Japan. Actuators and drives from these and other manufacturers may be used as well.

The air/fuel sensor 20 is positioned in the air/exhaust mixture 18 upstream of the catalytic converter 22 and is capable of measuring the air/fuel ratio in the air/exhaust mixture 18. That is, the air/fuel sensor 20 may measure the ratio of the amount of air to the amount of fuel. This may be expressed in the units of "parts per air per part fuel." The amount of air that is measured by the air/fuel sensor 20 may be primarily due to the air 16a injected by the blower 16, while the amount of fuel that is measured may be due to the unburned and partially-burned fuel in the exhaust stream 12e (i.e., from the combustion process). In one embodiment, the air/fuel sensor 20 is a Model MEXA-700 Lambda available from Horiba Instruments, Inc., of Ann Arbor, Mich. However, other air/fuel sensors may be used, including those from Horiba Instruments, Inc., as well as other manufacturers.

The system 10 may comprise a catalytic converter 22 which is disposed in the exhaust conduit 14 such that the air/exhaust mixture 18 flows through the catalytic converter 22. The catalytic converter 22 abates carbon monoxide in the air/exhaust mixture 18 based on an amount of oxygen in the air/exhaust mixture 18. In one embodiment, the catalytic converter 22 comprises a catalyst comprising platinum, palladium, rhodium, or combinations thereof. However, it is contemplated that the catalyst may comprise other suitable materials or alloys, including those known in the art as well as those yet to be discovered. The catalyst may have a honeycomb or other suitable structure in order to increase its surface area and provide a lower pressure increase in the exhaust flow relative to other structures. The catalytic converter 22 may be sized appropriately so that it can handle the volume of the air/exhaust mixture 18 created by the system 10 with a suitable pressure drop. The catalytic converter 22 may cause the CO and the oxygen (e.g., from the air) in the air/exhaust mixture 18 to react in the presence of the catalyst to produce carbon dioxide. In one embodiment, the chemical reaction in the catalytic converter 22 may be:

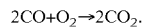

As an additional benefit, the catalytic converter 22 may also be able to oxidize unburned or partially-burned hydrocarbons in the air/exhaust mixture 18 by reacting them with oxygen to form carbon dioxide and water. The chemical reaction in the catalytic converter 22 may be:

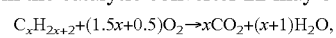

where "x" is 1, 3, 5, . . . , depending on the type of fuel.

The catalytic converter 22 may abate CO more efficiently if it is maintained within a particular operating temperature range. For the purposes of this disclosure, reference to the catalytic converter 22 is to be considered synonymous with reference to the catalyst; likewise, reference to the temperature of the catalytic converter 22 is to be considered synonymous with reference to the temperature of the catalyst. In one embodiment, the operating temperature range of the catalytic converter 22 is from about 550° C. to about 575° C. It is contemplated that the catalytic converter 22 may have other operating ranges depending on the type of catalyst used, its mechanical construction, and so forth. If the catalytic converter 22 operates at temperatures below its operating temperature range, the abatement of the CO may not be as efficient as when operating within its operating temperature range. On the other hand, if the catalytic converter 22 operates at temperatures above its operating temperature range, it may be susceptible to damage by heat. Thus, it is desirable to operate the catalytic converter 22 within its operating temperature range.

The catalytic converter 22 is disposed proximate to the source (e.g., the engine 12) producing the exhaust stream 12e (i.e., proximate to an inlet of the exhaust conduit 14). This allows the heat of the exhaust stream 12e to heat the catalytic converter to its operating temperature range without use of a heater, which may require a large amount of energy to operate and which may be susceptible to frequent maintenance due to the corrosive nature of the exhaust stream 12e. The heat of the exhaust stream 12e is the result of the combustion of the fuel which produces heat. The heat energy contained in the exhaust stream 12e is used to heat the catalytic converter 22 to its operating temperature range. The exhaust stream 12e loses heat energy as it flows through the exhaust conduit 14 such as, for example, where the exhaust stream 12e comes into contact with the sides of the exhaust conduit 14, including any joints, sections, couplers, etc. which makeup the exhaust conduit 14. Also, the exhaust stream 12e comes into contact with components (e.g., ports, an air/fuel sensor, temperature sensors) disposed within the exhaust conduit 14 which also remove heat energy from the exhaust stream 12e. Thus, the catalytic converter 22 is disposed proximate to the source producing the exhaust stream 12e so that it can be quickly be heated by the exhaust stream 12e to its operating temperature range. This improves the efficiency of the system 10 to abate CO in the exhaust stream 12e.

The system 10 comprises temperature sensors 24, 26 which are capable of measuring a temperature of the catalytic converter 22. The temperature sensors 24, 26 are thermally coupled to the catalytic converter 22 so that they measure the temperature of the catalytic converter 22 (or the catalyst therein). The temperature sensors 24, 26 are electrically coupled to the controller 30 such that the controller 30 is capable of reading the temperature of the catalytic converter 22 via the temperature signals 24a, 26a generated by the temperature sensors 24, 26. The temperature signals 24a, 26a may be analog signals such as, for example, an analog voltage or current signal; alternatively, they may be a digital signals. The temperature sensors 24, 26 may each comprise a thermocouple (e.g., a K-type thermocouple), a resistance thermal device (RTD), or any other suitable temperature measuring device. In one embodiment, a K-type thermocouple is used which produces an analog voltage which corresponds to the temperature of the thermocouple. The output of a K-type thermocouple is not linear, so the temperature signals 24a, 26a may have to be linearized (e.g., by the controller 30).

In one embodiment, a single sensor (e.g., a single thermocouple) may be used to measure the temperature of the catalytic converter 22. However, in the embodiment shown in FIG. 1, the temperature sensor comprises two sensors, a first temperature sensor 24 and a second temperature sensor 26. The first temperature sensor 24 is thermally coupled to the catalytic converter 22 and is disposed near the upstream portion of the catalytic converter 22 as shown in FIG. 1. The second temperature sensor 26 is thermally coupled to the catalytic converter 22 and is disposed near the downstream portion of the catalytic converter 22 as shown in FIG. 1. In order for the controller 30 to determine the temperature of the catalytic converter 22, the controller 30 takes the average of the two temperatures, the lower of the two temperatures, or the higher of the two temperatures. In one embodiment, the controller 30 determines the temperature of the catalytic converter 22 by taking the higher of the temperature of the first temperature sensor 24 and the second temperature sensor 26. However, it should be understood that other ways of determining the temperature of the catalytic converter 22 with two or more temperature sensors may be used as well. It is contemplated that three or more temperature sensors may also be used.

Figure 2:
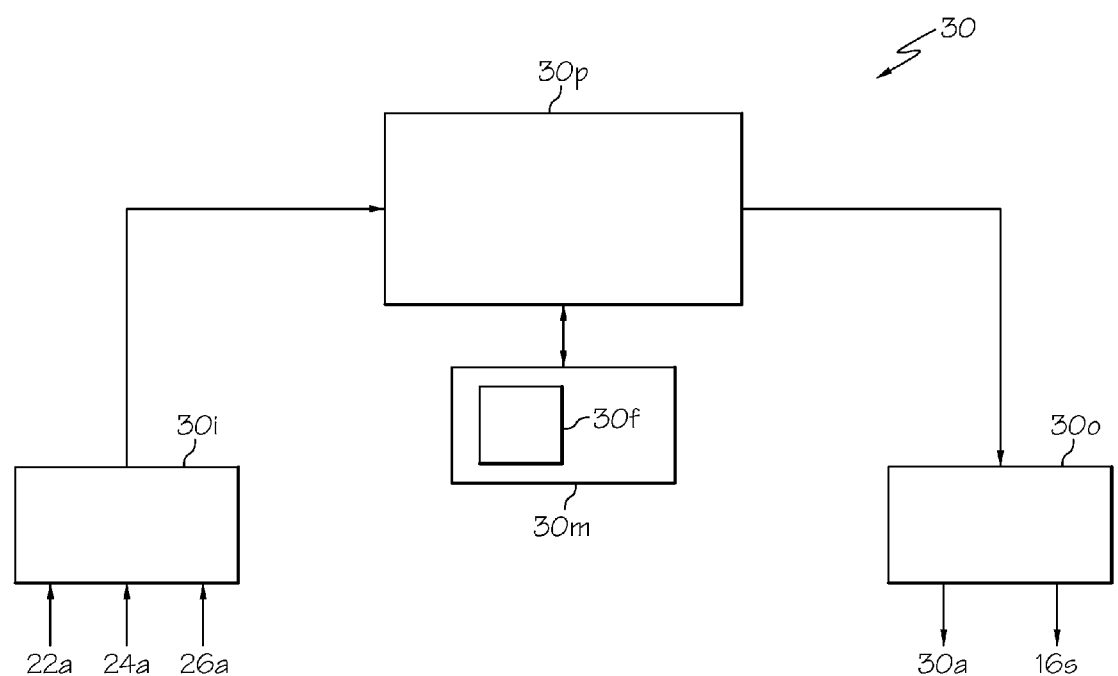
FIG. 2 schematically depicts a controller for abating carbon monoxide in an exhaust stream according to one or more embodiments shown and described herein.

Referring to FIG. 2, one embodiment of a controller 30 is depicted. The controller 30 may comprise a processor 30p, an input module 30i, an output module 30o, and a memory 30m. The processor 30p may comprise a microcontroller, microprocessor, digital signal processor, personal computer, programmable logic controller (PLC), or any other suitable device. The processor 30p may be capable of executing computer-readable and computer-executable instructions which embody the methods described herein. In one embodiment, the processor 30p may comprise a PLC from Toshiba International Corporation of Houston, Tex. The computer-readable and computer-executable instructions may comprise instructions from a computer language such as, for example, assembly language, the "C" programming language, the "C++" programming language, or any suitable programming language.

The input module 30i is capable of being electrically coupled to the air/fuel signal 20a and the temperature signals 24a, 26a (which may comprise a first temperature signal 24a and a second temperature signal 26a). The input module 30i receives these signals 20a, 24a, 26a and convert them into electrical signals which are read by the processor 30p. In this fashion, the processor 30p is able to read the value of the air/fuel ratio of the air fuel mixture and the temperature of the catalytic converter. The input module 30i comprises a data acquisition module, for example, which includes amplifiers and one or more analog-to-digital converters.

The output module 30o is electrically coupled to the blower and outputs the blower control signal 16s, the value of which is established by the processor 30p. The blower control signal 16s is transmitted to the blower and comprises an analog signal such as, for example, an analog voltage signal (e.g., 0 to 10 V) or analog current signal (e.g., 4 to 20 mA) such that the value of the analog signal corresponds to the blower speed that is required to provide sufficient amount of air to the exhaust stream. For example, if the analog signal is a voltage signal which operates from 0 to 10 V, a blower control signal 16s of 0 V may set the amount of air injected by the blower to zero cubic feet per minute (cfm); similarly a blower control signal 16s of 10 V may set the blower to operate at its maximum speed and thereby inject an amount of air equal to about 550 cfm. The blower control signal 16s may alternatively comprise a digital signal such as, for example, a universal asynchronous receiver/transmitter (UART) signal found in many processors. Thus, it is contemplated that the output module 30o is capable of outputting any blower control signal 16s which is suitable for the blower.

In one embodiment, the output module 30o also outputs an alarm signal 30a which is used to indicate that the CO abatement system has malfunctioned. The alarm signal 30a is an analog or digital signal, as discussed herein with respect to the blower control signal 16s. The alarm signal 30a is used to set an alarm such as, for example, a visual alarm (e.g., a light), an audible alarm (e.g., a buzzer), and/or a tactile alarm (e.g., a vibratory device). In one embodiment, the alarm signal 30a may also be electrically coupled to another controller (not shown) or the engine (not shown) which is producing the exhaust stream. As an example, the alarm signal 30a is electrically coupled to a controller which controls the operation of an engine test cell. This allows the engine test cell to shut down the testing of the engine when a fault is detected in the CO abatement system. Examples of faults that may occur in the CO abatement system include, but are not limited to, an over-temperature of a component (e.g., the catalytic converter), an excessive air/fuel ratio, and/or a malfunction of the blower.

The controller 30 also comprises a memory 30m which is used by the processor 30p to store variables used during the operation of the CO abatement system. The memory 30m is also capable of storing a computer program 30f comprising computer-readable and computer-executable instructions. The computer program 30f may embody the methods described herein for abating CO in an exhaust stream and is read and executed by the processor 30p. The memory 30m is also capable of storing system parameters such as, for example, the operating temperature range of the catalytic converter, the desired air/fuel ratio of the air/fuel mixture, and the gain constants used by the control algorithms. Some of these system parameters may be adjustable by a user.

Referring again to FIG. 1, the system 10 for abating CO in an exhaust stream 12e also comprises a blower valve 15, one or more pressure ports 32, 34, 44, one or more CO ports 36.46, one or more additional temperature sensors 38, 42, and an exhaust fan 28. As discussed herein, the blower valve 15 is disposed at the output of the blower 16 and is opened so as to fluidly couple the blower 16 to the exhaust stream 12e. Alternatively, the blower valve 15 may be closed so as to fluidly decouple the blower 16 from the exhaust stream 12e. The blower valve 15 is generally fully opened when the system 10 is operating.

In one embodiment, the system 10 also has one or more pressure ports 32, 34, 44. Pressure port 32 is disposed at the outlet of the blower 16 upstream the blower valve 15. Pressure port 34 is disposed downstream of the blower valve 15. And pressure port 44 is disposed downstream of the catalytic converter 22. Each of the pressure ports 32, 34, 44 is used to measure a pressure of the air or the air/exhaust mixture. As such, they may be used for testing, development, or maintenance purposes. For example, the pressure ports 32, 34, 44 may be used to verify that the catalytic converter 22 does not have an obstruction which blocks the flow of the air/exhaust mixture 18.

In another embodiment, the system 10 comprises one or more CO ports 36, 46. CO port 36 is disposed upstream the catalytic converter 22, while CO port 46 is disposed downstream of the catalytic converter 22. Each of the CO ports 36, 46 may be used to measure a CO level of the air/exhaust mixture. As such, they may be used for testing, development, or maintenance purposes. For example, the CO ports 36, 46 may be used for periodic testing of the system 10 to make sure it is properly abating CO in the exhaust stream 12e.

In another embodiment, the system 10 also comprises one or more additional temperature sensors 38, 42. Additional temperature sensor 38 is disposed upstream the catalytic converter 22, while additional temperature sensor 42 is disposed downstream of the catalytic converter 22. Each of the additional temperature sensors 38, 42 may be used to measure the temperature of the air/exhaust mixture. As such, they may be used for testing, development, or maintenance purposes. As an example, the additional temperature sensor 38, 42 may by used to insure that the air/exhaust mixture 18 does not exceed a predetermined temperature limit.

In another embodiment, the system 10 also comprises an exhaust fan 28. The exhaust fan 28 is fluidly coupled to CO-abated air/exhaust mixture 22e downstream of the catalytic converter 22 and forces the CO-abated air/exhaust mixture 22e into the atmosphere. The exhaust fan 28 is not required for the operation of the system 10 but may facilitate its operation, particularly when multiple CO abatement systems are disposed in the same area or the same building.

Figure 3:
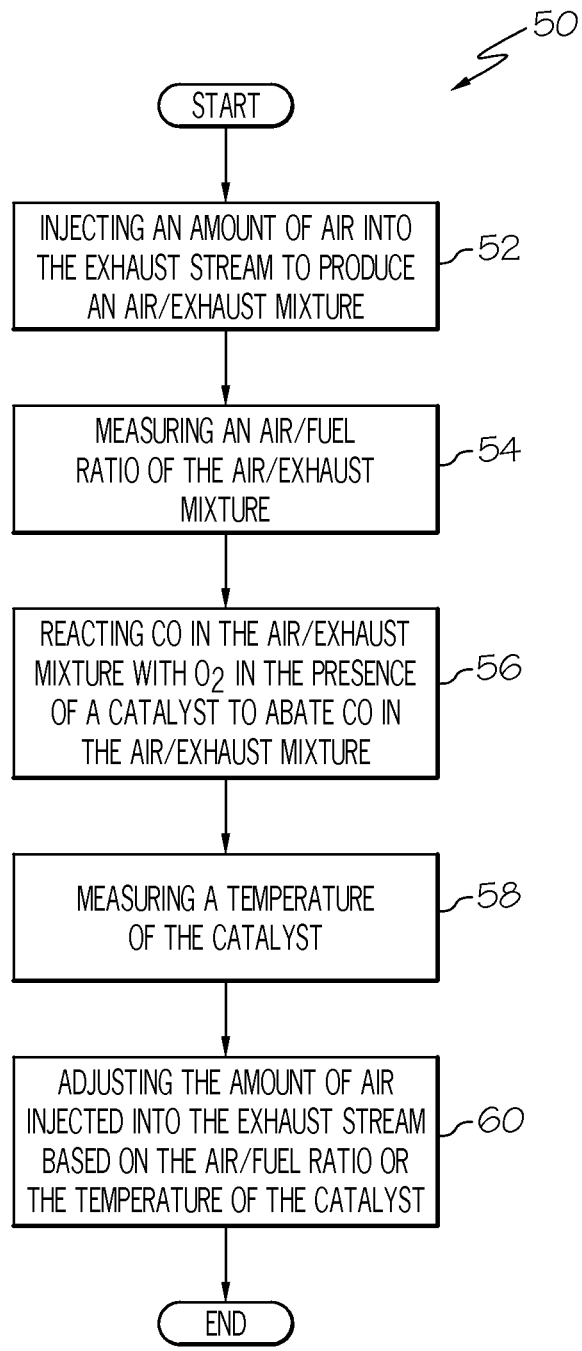
FIG. 3 schematically depicts a method for abating carbon monoxide in an exhaust stream according to one or more embodiments shown and described herein.

Referring now to FIGS. 1-3, a flow diagram of one method 50 for abating CO in an exhaust stream 12e is depicted. The method 50 comprises a number of steps, which can be performed in any suitable order. At step 52, an amount of air 16a is injected into the exhaust stream 12e so as to produce an air/exhaust mixture 18. As discussed herein, the amount of air 16a is injected by a blower 16 fluidly coupled to the exhaust stream 12e. The amount of air 16a is adjustable by adjusting a blower control signal 16s provided to the blower 16, as described above. At step 54, an air/fuel ratio of the air/exhaust mixture 18 is measured. In the embodiment shown herein, this is done by an air/fuel sensor 20 which outputs an air/fuel signal 20a indicative of the air/fuel ratio of the air/exhaust mixture 18.

At step 56, CO in the air/exhaust mixture 18 is reacted with oxygen in the catalytic converter 22 to abate the CO in the air/exhaust mixture 18 by producing carbon dioxide. The catalytic converter 22 abates the CO in the air/exhaust mixture 18 based on the amount of oxygen in the air/exhaust mixture 18. At step 58, a temperature of the catalytic converter 22 is measured. In the embodiment shown herein, the temperature is measured with the temperature sensors 24, 26 which output temperature signals 24a, 26a indicative of the temperature of the catalytic converter 22. At step 60, the amount of air 16a injected into the exhaust stream 12e is adjusted based on the air/fuel ratio or the temperature of the catalytic converter 22. This is accomplished, for example, by using a controller 30 which receives the air/fuel signal 20a and the temperature signals 24a, 26a, determines the blower control signal 16s based on air/fuel signal 20a or the temperature signals 24a, 26a, and outputs the blower control signal 16s to the blower 16 to adjust the amount of air 16a injected into the exhaust stream 12e.

The following example illustrates the operation of the method 50 of FIG. 3 as well as the system 10 of FIG. 1. Assume that the operating temperature range of the catalytic converter (or the catalyst) is about 550° C. to about 575° C. and the stoichiometric point of the fuel is 14.7 parts air per part fuel. When the temperature of the catalytic converter is below 550° C., the controller adjusts the amount of air injected into the exhaust stream so that the air/fuel ratio of the air/exhaust mixture is 14.7 parts air per part fuel. Thus, if the air/fuel ratio is less than 14.7, the controller increases the amount of air injected by the blower (e.g., by adjusting the control signal) in order to increase the air/fuel ratio. The controller continues to increase the amount of air injected by the blow until the air/fuel ratio reaches 14.7 parts air per part fuel. On the other hand, if the air/fuel ratio is greater than 14.7, the controller decreases the amount of air injected by the blower (e.g., by adjusting the control signal) in order to decrease the air/fuel ratio. The controller continues to decrease the amount of air injected by the blower until the air/fuel ratio reaches 14.7. In this manner, the controller adjusts the amount of air injected by the blower into the exhaust stream in order to maintain the air/fuel ratio at 14.7 parts air per part fuel. When operating in this manner, the system is said to be operating in "air/fuel ratio mode."

Continuing with this example, if the temperature of the catalytic converter is equal to or above 550° C., the controller adjusts the amount of air injected into the exhaust stream so that the temperature of the catalytic converter is maintained between 550° C. and 575° C. (i.e., within the operating temperature range of the catalytic converter). Thus, if the temperature is within the operating temperature range, the controller maintains the amount of air injected by the blower (e.g., via the control signal) in order to maintain the temperature of the catalytic converter. On the other hand, if the temperature of the catalytic converter is greater than 575° C., the controller increases the amount of air injected by the blower (e.g., by adjusting the control signal) in order to decrease the temperature (since the ambient temperature of the air injected by the blower may be ordinary air having a relatively cool ambient temperature, e.g., 15° C. to 30° C.). The controller continues to increase the amount of air injected by the blower until the temperature falls below 575° C. (i.e., falls to within the operating temperature range of the catalytic converter). In this manner, the controller adjusts the amount of air injected by the blower into the exhaust stream in order to maintain the temperature of the catalytic converter to within its operating temperature range. When operating in this manner, the system is said to be operating in "temperature mode."

As described in the previous example, the system is capable of operating in either air/fuel ratio mode or temperature mode, and it may be capable of switching back and forth between these two modes of operation as the situation requires (e.g., when the flow of the exhaust stream changes). The system may also recognize a fault if, for example, the air/fuel ratio becomes excessive (e.g., less than 5 parts air per part fuel) or the temperature of the catalyst becomes too hot (e.g., greater than 600° C.), in which case the system activates an alarm signal. The alarm signal is coupled to either the engine or a controller supervising the engine so that, when a fault is recognized, the engine may be safely shut down.

The update rate at which the blower is adjusted depends on the response time of the system. This may include, but is not limited to, the response time of the blower, the air/fuel sensor, the temperature sensor, and the catalytic converter (i.e., thermal response time). The blower and catalytic converter may have slower response times than the air/fuel sensor and the temperature sensor, and they collectively may establish the overall update rate at which the blower is adjusted by the controller. For example, the response time for the air/fuel sensor and the temperature sensor may be about 50 to about 250 milliseconds. However, the response time of the blower may be about 500 milliseconds to about 2 seconds, and the thermal response time of the catalytic converter may be about 1 second to about 10 seconds. As is known in the art, the response time of any of these components may depend, at least in part, on the overall physical mass of the component. Thus, a larger catalytic converter may have a slower response time than a smaller one. The systems and methods shown and described herein may be designed so that the update rate of the system (e.g., the update rate of the blower) takes into account these response times.

It should now be understood that the systems and methods described herein may abate CO in an exhaust stream produced by the combustion of fuel. The combustion may take place in an internal combustion engine used in automobiles, trucks, and other types of vehicles. The systems and methods may abate CO in the exhaust stream by injecting air into the exhaust stream, reacting CO with oxygen in the air in the presence of a catalyst, and controlling the air/fuel ratio of the air/exhaust mixture or controlling the temperature of the catalyst. The air may be injected into the exhaust stream by a blower to produce an air/exhaust mixture. The catalyst may cause the CO to react with the oxygen to create carbon dioxide. And a controller may monitor the air/fuel ratio and the temperature of the catalyst and adjust the amount of air injected into the exhaust stream so as to control either the air/fuel ratio or the temperature of the catalyst.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for abating carbon monoxide in an exhaust stream, the method comprising:
    injecting an amount of air into the exhaust stream upstream of a catalyst to produce an air/exhaust mixture before catalyzing the exhaust stream, wherein the catalyst catalyzes a chemical reaction of $2CO+O_2 \rightarrow 2CO_2$;
    measuring an air/fuel ratio of the air/exhaust mixture upstream of the catalyst;
    reacting carbon monoxide in the air/exhaust mixture with oxygen in the presence of the catalyst to produce carbon dioxide to abate carbon monoxide in the air/exhaust mixture, wherein the catalyst has an operating temperature range;
    measuring a temperature of the catalyst, when the temperature of the catalyst is below the operating temperature range;
    measuring the temperature of the catalyst, when the temperature of the catalyst is within or above the operating temperature range;
    adjusting the amount of air injected into the exhaust based on the air/fuel ratio and not the temperature of the catalyst, when the temperature of the catalyst is below the operating temperature range of the catalyst; and
    adjusting the amount of air injected into the exhaust based on the temperature of the catalyst and not the air/fuel ratio, when the temperature of the catalyst is within or above the operating temperature range of the catalyst.

2. The method of claim 1, wherein the catalyst is selected from the group consisting of platinum, palladium, rhodium, and combinations thereof.

3. The method of claim 1, wherein the catalyst is disposed proximate to a source of the exhaust stream such that the exhaust stream heats the catalyst to an operating temperature range without use of a heater.

4. The method of claim 1, wherein the operating temperature range of the catalyst is about 550° C. to about 575° C.

5. The method of claim 1, wherein the amount of air injected into the exhaust stream is adjusted such that the air/fuel ratio of the air/exhaust mixture is between about 14 parts air per part fuel and about 15 parts air per part fuel.

6. The method of claim 1, wherein the amount of air injected into the exhaust stream is adjusted such that the temperature of the catalyst is maintained within an operating temperature range of the catalyst.

7. The method of claim 6, wherein the operating temperature range of the catalyst is about 550° C. to about 575° C.

8. A system for abating carbon monoxide in an exhaust stream flowing in an exhaust conduit, the system comprising a blower, a catalytic converter, an air/fuel sensor, a temperature sensor, and a controller, wherein:
the blower is fluidly coupled to the exhaust conduit upstream of the catalytic converter and is electrically coupled to the controller, wherein the blower injects an amount of air into the exhaust stream flowing in the exhaust conduit to produce an air/exhaust mixture before catalyzing the exhaust stream;
the catalytic converter is disposed in the exhaust conduit downstream of the blower such that the air/exhaust mixture flows through the catalytic converter, wherein the catalytic converter catalyzes a chemical reaction of $2CO+O_2 \rightarrow 2CO_2$ and abates carbon monoxide in the air/exhaust mixture based on an amount of oxygen in the air/exhaust mixture;
the catalytic converter has an operating temperature range and operates such that a temperature of the catalytic converter reaches values below the operating temperature range of the catalytic converter and within or above the operating temperature range of the catalytic converter;
the air/fuel sensor is disposed in the exhaust conduit upstream of the catalytic converter and is electrically coupled to the controller, wherein the air/fuel sensor outputs an air/fuel signal indicative of an air/fuel ratio of the air/exhaust mixture;
the temperature sensor is thermally coupled to the catalytic converter and electrically coupled to the controller, wherein the temperature sensor outputs a temperature signal indicative of the temperature of the catalytic converter; and
the controller comprises a processor and a memory having computer-readable and computer-executable instructions, and the processor executes the computer-readable and computer-executable instructions to:
receive the air/fuel signal from the air/fuel sensor,
receive the temperature signal from the temperature sensor,
determine a blower control signal based on the air/fuel signal and not the temperature signal, when the temperature of the catalytic converter is below the operating temperature range of the catalytic converter,
determine a blower control signal based on the temperature signal and not the air/fuel signal, when the temperature of the catalytic converter is within or above the operating temperature range of the catalytic converter, and
output the blower control signal to the blower to adjust the amount of air injected into the exhaust stream.

9. The system of claim 8, wherein the catalytic converter comprises a selected from the group consisting of platinum, palladium, rhodium, and combinations thereof.

10. The system of claim 8, wherein the catalytic converter is disposed in the exhaust conduit proximate to an inlet of the exhaust conduit such that the exhaust stream heats the catalytic converter to an operating temperature range of the catalytic converter without use of a heater.

11. The system of claim 10, wherein the operating temperature range of the catalytic converter is about 550° C. to about 575° C.

12. The system of claim 11, wherein the blower control signal is determined such that the air/fuel ratio of the air/exhaust mixture is between about 14 parts air per part fuel and about 15 parts air per part fuel.

13. The system of claim 10, wherein the blower control signal is determined to maintain the catalytic converter within the operating temperature range of the catalytic converter when the temperature of the catalytic converter is within or above the operating temperature range.

14. The system of claim 13, wherein the operating temperature range of the catalytic converter is about 550° C. to about 575° C.

15. The system of claim 10, wherein the temperature sensor comprises a first thermocouple and a second thermocouple, wherein the first thermocouple is disposed upstream of the catalytic converter, and the second thermocouple is disposed downstream of the catalytic converter.

16. The system of claim 15, wherein the temperature of the catalytic converter is determined by taking the higher of a temperature of the first thermocouple and a temperature of the second thermocouple.

17. A system for testing an internal combustion engine having an engine exhaust outlet to carry away an exhaust stream produced by the internal combustion engine, the system comprising an exhaust conduit, a blower, a catalytic converter, an air/fuel sensor, a temperature sensor, and a controller, wherein:
the exhaust conduit is fluidly coupled to the engine exhaust outlet of the internal combustion engine and receives the exhaust stream produced by the internal combustion engine;
the blower is fluidly coupled to the exhaust conduit upstream of the catalytic converter and is electrically coupled to the controller, wherein the blower injects an amount of air into the exhaust stream flowing in the exhaust conduit to produce an air/exhaust mixture before catalyzing the exhaust stream;
the catalytic converter is disposed in the exhaust conduit downstream of the blower such that the air/exhaust mixture flows through the catalytic converter, wherein the catalytic converter catalyzes a chemical reaction of $2CO+O_2 \rightarrow 2CO_2$ and abates carbon monoxide in the air/exhaust mixture based on an amount of oxygen in the air/exhaust mixture;
the catalytic converter has an operating temperature range and operates such that a temperature of the catalytic converter reaches values below the operating temperature range of the catalytic converter and within or above the operating temperature range of the catalytic converter;
the air/fuel sensor is disposed in the exhaust conduit upstream of the catalytic converter and is electrically coupled to the controller, wherein the air/fuel sensor outputs an air/fuel signal indicative of an air/fuel ratio of the air/exhaust mixture;

the temperature sensor is thermally coupled to the catalytic converter and electrically coupled to the controller, wherein the temperature sensor outputs a temperature signal indicative of the temperature of the catalytic converter; and the controller comprises a processor and a memory having computer-readable and computer-executable instructions, and the processor executes the computer-readable and computer-executable instructions to:

receive the air/fuel signal from the air/fuel sensor, receive the temperature signal from the temperature sensor, determine a blower control signal based on the air/fuel signal and not the temperature signal, when the temperature of the catalytic converter is below the operating temperature range of the catalytic converter such that the air/fuel ratio of the air/exhaust mixture is maintained between about 14 parts air per part fuel and about 15 parts air per part fuel determine a blower control signal based on the temperature signal and not the air/fuel signal, when the temperature of the catalytic converter is within or above the operating temperature range of the catalytic converter such that the temperature of the catalytic converter is maintained within the operating temperature range, and output the blower control signal to the blower to adjust the amount of air injected into the exhaust stream.

18. The system of claim 17, wherein the catalytic converter is disposed in the exhaust conduit proximate to the internal combustion engine such that the exhaust stream heats the catalytic converter to the operating temperature range without use of a heater.

* * * * *